3,420,690
ARTIFICIALLY COLORED MINERAL GRANULES
Romayne M. Beyard and John C. Horai, Hagerstown, Md., assignors to The Ruberoid Co., New York, N.Y., a corporation of New Jersey
No Drawing. Filed May 6, 1966, Ser. No. 547,745
U.S. Cl. 117—62        11 Claims
Int. Cl. C04b 31/28

This invention relates to artificially colored granules and, more particularly, to an improved method for applying colored coatings to mineral granules that will substantially eliminate the tendency of the resultant granules to develop haze and to bloom. The term "haze" referred to herein is defined as a visible white efflorescence formed on the surface of the granules when exposed to certain environmental conditions, such as moisture, heat or both. Visible white crystals develop on the surfaces of the granules after they are exposed to moisture with subsequent freezing, thawing, and evaporating of the condensed water are termed "cold bloom." The artificially colored granules of this invention are particularly suitable as surfacing material to protect the asphalt coatings of sheets, shingles, and sidings of bituminously impregnated and coated felt from the deteriorating action of the weather and to provide a pleasing and decorative surface for asphalt or other substrates.

In the manufacturing of artificially colored granules a low temperature process is frequently used in the industry. In carrying out this process, preheated, crushed, and graded mineral granules are mixed with an aqueous slurry containing a pigment and sodium silicate to provide color coatings thereon. The coated granules are dried and further dehydrated at below about 600° F. in a rotary kiln. After drying and while the granules are still at a raised temperature of approximately 400° F., an aqueous solution of an acidic pickling compound is applied to the hot granules to complete the insolubilization of the silicate coating. Residual water on the granules is evaporated by the latent heat remaining in the treated granules. A number of acidic pickling compounds may be used for the insolubilization of the silicate coating. Most commonly used are aluminum chloride, ammonium chloride or their mixture. The colored granules after cooling are subject to a surface treatment to increase their adhesion to the bituminous material. A conventional after treatment is coating the granules with a suitable oil with or without additives.

Heretofore the artificial colored granules produced by this process may tend to develop haze or to bloom when they are exposed to the environmental conditions that are normally encountered during manufacturing and in subsequent storage and use of the resultant granules. The formation of haze on the surfaces of the granules is frequently due to the presence of opaque salts such as sodium chloride, which is a chemical by-product of the insolubilization process. The opaque salt may not always be readily visible when the coated granules are produced because of their distribution, particle size, crystalline structure and other factors. However, when the coated granules are subsequently exposed to varying environmental conditions, the salt distribution on the surface of the granules may be changed by recrystallization into larger visible particles.

Cold bloom is caused by the formation of carbonate or other salts when the granules are exposed to the atmosphere containing moisture and carbon dioxide causing the sodium ions, such as those from sodium hydroxide on the surface of the granules to react with carbon dioxide absorbed from that available in the atmosphere or by the formation of sodium chloride from the by-products of insolubilization. Subsequent freezing, thawing and evaporation of the water concentrates the salt on the surface and causes recrystallization into opaque salt crystals.

The efflorescence of the artificially colored granules which manifests itself in the form of haze or bloom are quality deterrents for granule surfaced sheets, shingles, sidings and the like. The existing manufacturing techniques and procedures for the production of colored granules and granule surfaced roofing further enhance the tendency of the granules to develop haze or to bloom. For example, in the manufacture of roofing shingles, the artificially colored granules are applied to a hot and tacky asphalt coating on a continuous web. The granule surfaced web must be cooled prior to cutting into final shape or size of the shingle. Water spray is commonly used to cool the backside of the web and frequently shingles are packed before all the moisture has been evaporated. During storage and in subsequent use of the shingles the environmental conditions may be sufficient for the development of efflorescence. Therefore, colored granules and their surface materials that are found to be satisfactory in the manufacture may undergo a distinct color change later because of nonuniform hazing or blooming during the storage or in actual use which lead to unsightly and nonuniform colored roofs or sidings. Oftentimes, in different or same bundles of product light and dark shades of the same colored granule surfaced products may result due to efflorescence.

It is therefore, a principal object of this invention to provide a method for manufacturing artificially colored granules which will substantially reduce the tendency of the resultant granules to develop haze or to bloom. The invention is based on the discovery that ethylenediamine tetraacetic acid or one of its salts when applied on the color coating will substantially prevent the growth of opaque salt crystals on the surface of the coated granules. This eliminates the problems of efflorescence commonly encountered in colored granules and their surfaced products.

In accordance with the method of this invention for manufacturing artificially colored granules, the mineral granules are initially coated with a coloring composition comprising a pigment and an aqueous alkali silicate. The silicate on the granules is substantially dehydrated by heating the coated granules to a temperature below about 600° F. The dehydrated silicate coating is then insolubilized to bond the pigment to the base granules by applying an aqueous solution of an insolubilizing agent. Simultaneously or in sequence, a chelating agent selected from the group consisting of ethylenediamine tetraacetic acid and its salts is applied on the coating in an amount sufficient to prevent substantially the development of haze and bloom on the surface of the coated granules.

The exact mechanism by which the chelating agent prevents the development of haze or bloom is not yet completely determined. It may be the result of sequestering the cations and ionized salts presented in the coating or it may be due to the the film forming property of the agent which prevents orderly growth of salt crystals. Both mechanisms are in evidence on laboratory glass spot tests.

Among the chelating agents that can be used in the process of the present invention, are ethylenediamine tetraacetic acid (EDTA):

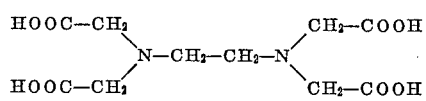

and its sodium salts. Particularly effective are the sodium salts of EDTA such as the trisodium ethylenediamine tetraacetate and tetrasodium ethylenediamine tetraacetate. The disodium salt of EDTA:

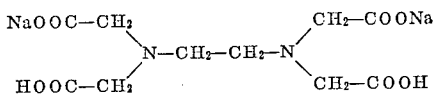

may also be used. The triisodium salt of EDTA is available commercially. An example is General Aniline & Film Corporation's Cheelox BF Na₃. Similarly, the tetrasodium salt of EDTA may be obtained readily from General Aniline and Film Corporation under the trade name of Cheelox BF 13 and from Rozilda Laboratory under the trade name of Roquest 244P.

The method of this invention has the further advantage that it utilizes the existing low temperature process for manufacturing artificially colored mineral granules with only minor modifictaions. For example, when the method of this invention is applied to the existing low temperature process in which the coated granules are dehydrated at a temperature below about 600° F. and subsequently insolubilized by an aqueous solution of an insolubilizing agent, such as aluminum chloride, aluminum sulfate, ammonium chloride, sodium nitrate, hydrochloric acid, ferric chloride, and magnesium chloride, the chelating agent may be applied separately or in conjunction with the aqueous insolubilizing solution. Each of the resultant colored granules comprise a mineral base granule coated with a pigment bonded in a water resistant and water insoluble silicate matrix. On the color coated and fired granules is the chelating agent in an amount sufficient to prevent substantially the development of haze and bloom on the surface of the coated granules.

The amount of the chelating agent that is required to retard the development of haze and/or the formation of bloom in the low temperature processed granules may vary within a wide range depending on the size of the granules, the grade of the silicate, the insolubilizing agent and other process conditions. We find chelating agent in an amount as little as 0.1 pound per ton of granules to be effective. However, in general, for a conventional size 11 granules, the optimum amount is within the range of 0.6 to 0.8 pound per ton. The upper limit does not appear to be critical. However, using an amount much above one pound of chelating agent per ton of granules does not appear to provide any additional beneficial results, and therefore, has no economic advantage.

For the modified low temperaturer process, the application of the chelating agent, EDTA or its salt to the coated granules is preferably at a temperature substantially below the exit temperatures of the heated treated granules from the rotary kiln. The application temperature should be below about 300° F. and preferably in the neighborhood of 250° F. A lower temperature, of course, may also be used, however, the heat retained in the granules may not be sufficient to completely evaporate any residual water.

Suitable base granules can be selected from a wide class of relatively porous or non-porous and weather-resistant rock or mineral. Suitable minerals include trap rocks, slates, argillite, greystone, greenstone, quartz, quartzite, certain granites, synthetic granules made from calcined clay or other ceramics, etc. In general the preferred base granules are derived from relatively non-porous minerals.

In preparing artificially colored granules, using the modified low temperature process of this invention the natural mineral such as greenstone is crushed and screened to desired size, generally to pass a "10 mesh" screen and be retained on a "35 mesh" screen. The screened granules are initially heated to approximately 100–130° F. and then are mixed with an aqueous slurry containing a pigment and sodium silicate in a tumbling barrel type mixer. The amount of sodium silicate and pigment used may be varied depending on the grade of silicate and the pigment or pigments used. Any pigments that are found to be suitable for the existing low temperature processed may be used. Examples of this type of pigment are, red iron oxide, iron oxide yellow, phtholocyanine green, chromic oxide, special clay, titanium oxide, etc. In general these pigments may be used alone or in combination. The amount of pigment or pigments used may range from 3 pounds to about 50 pounds per ton of granules.

The preferred grades of sodium silicate have a ratio of $Na_2O$ to $SiO_2$ of 1:2 to 1:3.25. A commercial example of a sodium silicate of this type is the "N" brand sodium silicate currently sold by the Philadelphia Quartz Company which has a ratio of $Na_2O$ to $SiO_2$ of 1:3.22, a gravity of 41° Baumé and a solid content of 37–39 percent. The alkalinity of the silicate may be varied within the range stated above. Increasing the alkalinity generally raises the requirements of the insolubilizer which in some instances appears to be detrimental to the effectiveness of the chelating agent. For optimum results, it is essential to maintain a specific proportion of the chelating agent and insolubilizing agent which can be best determined by actual experimentation. Additional water may be used to dilute the insolubilizer and chelating mixture.

After the granules are thoroughly coated in the tumbling barrel mixer, they are pre-dried and then are fired in a rotary kiln at a temperature above 200° F. but usually below about 600° F. for substantially complete dehydration thereof. Subsequent to firing, the granules are cooled to above room temperature, preferably to form 150° to 200° F. in a rotary type cooler. Sufficient water may be used to accelerate the cooling. During the cooling period a solution of an insolubilizing agent containing the chelating agent is applied to the coated hot granules by spraying to insolubilize completely the silicate and to apply on the surface of the insolubilized silicate a sufficient amount of said chelating agent to prevent the development of haze and bloom. The granules are then cooled and treated with a mineral oil, or other suitable surfacing treatment material to increase their adhesion to the bituminous coating.

In a specific example for manufacturing artificially colored mineral granules according to the modified low temperature process described hereinabove, the screened granules are first pre-heated to about 110° F. and then are mixed with an aqueous sodium silicate solution (ratio of $Na_2O$ to $SiO_2$ is 1 to 3.25) containing a conventional pigment. The coated granules are pre-dried and fired at a temperature of 500° F. substantially to dehydrate the silicate in a rotary kiln. The fired granules are cooled by water spray to approximately 200° F. During this cooling period a 28 percent aqueous solution of aluminum chloride containing a fixed amount of Cheelox BF Na₃ is applied to the granules at about 250° F. The relative proportion of Cheelox BF Na₃ and aluminum chloride used in the process is approximately 1 part of Cheelox BF Na₃ by weight of 16 parts of aluminum chloride. An excess amount of aluminum ion should be avoided since the chelating agent may preferentially sequester the trivalent metal ion. It is found to be essential that the ratio of aluminum chloride to sodium silicate be maintained to the minimum value required for the insolubilization. The resultant granules produced in this example are used in comparative tests as employed in the industry to determine efflorescence in the form of haze and bloom with granules produced in a similar process except that Cheelox BF Na₃ is not used.

The standard laboratory procedures for producing haze on granules consists of thoroughly wetting 25 grams of sample with 7 mls. of distilled water in a petri dish, drying the sample for one and one-half hours in an oven with a regulated temperature of 230° F. and evaluating the granules for degree of haze developed. In a standard bloom test, 50 grams of sample is wetted with 30 mls. of water in a petri dish and then the wetted sample is exposed to a saturated carbon dioxide atmosphere for 3 hours. After exposing the wetted granules to the $CO_2$ atmosphere, they are frozen in a freezer for a period of one and one-half hours and subsequently are thawed out in a refrigerator with a regulated temperature of 42° F. and a 30 percent relative humidity. Granules are placed under a fan during thawing period of facilitate evaporation. After the granules are dried, the degree of bloom developed thereon is evaluated.

In the comparison tests according to the procedures described above, the granules produced in accordance with the specific examples are rated as trace in efflorescence as compared to slight or moderate for those produced without the use of the Cheelox BF Na$_3$. The quality of the granules produced in accordance with this method is high and is not impaired by the chelating agent as evaluated according to standard and accepted laboratory procedures.

We claim:

1. A method for manufacturing artificially colored mineral granules which comprises (i) coating the granules with a colored composition comprising a pigment and an aqueous alkali silicate, (ii) heating the coated granules to a temperature below about 600° F. substantially to dehydrate the silicate in the coating, (iii) insolubilizing said silicate, and (iv) applying to the silicate a chelating agent selected from the group consisting of ethylenediamine tetraacetic acid and its salts in an amount sufficient to prevent substantially the development of haze and bloom on the surface of the coated granules.

2. A method for manufacturing artificially colored mineral granules which comprises (i) coating the granules with a colored composition comprising a pigment and an aqueous sodium silicate, (ii) heating the coated granules to a temperature below about 600° F. substantially to dehydrate the silicate, (iii) applying an aqueous solution of an insolubilizing agent selected from the group consisting of aluminum chloride, ammonium chloride, hydrochloric acid, aluminum sulfate, aluminum nitrate, ferric chloride, and magnesium chloride to insolubilize the sodium silicate, and (iv) applying with said insolubilizer a chelating agent selected from the group consisting of ethylenediamine tetraacetic acids and its salts in an amount sufficient to prevent substantially the development of haze and bloom on the surface of the coated granules.

3. A method according to claim 2 wherein said chelating agent is ethylenediamine tetraacetic acid.

4. A method according to claim 2 wherein said chelating agent is trisodium ethylenediamine tetraacetate.

5. A method according to claim 2 wherein said chelating agent is disodium ethylenediamine tetraacetate.

6. A method according to claim 2 wherein said chelating agent is tetrasodium ethylenediamine tetraacetate.

7. Artificially colored granules each comprising a mineral base granule coated with coloring pigment and bonded to the surface of the granule in a water resistant and water insoluble silicate matrix, and on the surface of which there is a chelating agent selected from the group consisting of ethylenediamine tetraacetic acids and its salts in an amount sufficient to prevent substantially the development of haze and bloom of the coated granules.

8. Artificially colored granules according to claim 7 wherein said chelating agent is ethylenediamine tetraacetic acid.

9. Artificially colored granules according to claim 7 wherein said chelating agent is disodium ethylenediamine tetraacetate.

10. Artificially colored granules according to claim 7 wherein said chelating agent is trisodium ethylenediamine tetraacetate.

11. Artificially colored granules according to claim 7 wherein said chelating agent is tetrasodium ethylenediamine tetraacetate.

References Cited

UNITED STATES PATENTS

| | | | |
|---|---|---|---|
| 1,991,981 | 2/1935 | Hillers | 117—100 X |
| 2,233,358 | 2/1941 | Nutting | 106—308 X |
| 2,774,736 | 12/1956 | Stieh | 106—308 X |
| 2,852,406 | 9/1958 | Riegler et al. | 106—308 X |
| 2,943,002 | 6/1960 | Langseth | 117—100 |
| 2,982,665 | 5/1961 | Wilcox | 106—308 |
| 2,981,635 | 4/1961 | Lodge | 117—100 X |

WILLIAM D. MARTIN, *Primary Examiner.*

M. R. P. PERRONE, JR., *Assistant Examiner.*

U.S. Cl. X.R.

117—70, 62; 106—308